(12) United States Patent
Wu et al.

(10) Patent No.: US 11,264,647 B2
(45) Date of Patent: Mar. 1, 2022

(54) BATTERY

(71) Applicant: INDUSTRIAL TECHNOLOGY RESEARCH INSTITUTE, Hsinchu (TW)

(72) Inventors: Wei-Hsin Wu, Hsinchu (TW); Chih-Ching Chang, Hsinchu (TW); Han-Jung Li, Taoyuan (TW); Jen-Jeh Lee, Taipei (TW); Chia-Chen Fang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 305 days.

(21) Appl. No.: 16/584,636

(22) Filed: Sep. 26, 2019

(65) Prior Publication Data

US 2020/0161708 A1     May 21, 2020

Related U.S. Application Data (60) Provisional application No. 62/769,182, filed on Nov. 19, 2018.

(30) Foreign Application Priority Data

May 13, 2019    (TW) ................. 108116351

(51) Int. Cl.
*H01M 10/00*     (2006.01)
*H01M 10/0569*    (2010.01)
(Continued)

(52) U.S. Cl.
CPC ....... *H01M 10/0569* (2013.01); *H01M 4/382* (2013.01); *H01M 10/052* (2013.01);
(Continued)

(58) Field of Classification Search
CPC ..... H01M 10/0525; H01M 2300/0037; H01M 4/405; H01M 2300/0034; H01M 4/58; Y02P 70/50
See application file for complete search history.

(56) References Cited

U.S. PATENT DOCUMENTS 9,982,068 B2    5/2018   Gavvalapalli et al.
10,087,538 B2   10/2018   Gordon
(Continued)

FOREIGN PATENT DOCUMENTS

CN     101601150 A    12/2009
CN     101640291 A    2/2010
(Continued)

OTHER PUBLICATIONS

Adams et al., "Accurate Determination of Coulombic Efficiency for Lithium Metal Anodes and Lithium Metal Batteries", Advanced Energy Materials, 2018, vol. 8, Issue 7, Mar. 5, 2018, 1702097, pp. 1-11.
(Continued)

*Primary Examiner* — Cynthia H Kelly
*Assistant Examiner* — Monique M Wills
(74) *Attorney, Agent, or Firm* — Birch, Stewart, Kolasch & Birch, LLP (57) ABSTRACT

A battery is provided, which includes an anode and a cathode. The anode includes a first current collector and anode active material. The anode active material is lithium metal or lithium alloy. The cathode includes a second current collector and cathode active material. The battery also includes an electrolyte film disposed between the cathode and the anode, and a porous film disposed between the electrolyte film and the anode. The battery includes an anolyte in the porous film between the electrolyte film and the anode, and a catholyte between the electrolyte film and
(Continued)

the cathode. The catholyte is different from the anolyte, and the anolyte and the catholyte are separated by the electrolyte film and are not in contact with each other.

10 Claims, 9 Drawing Sheets

(51) Int. Cl.
  *H01M 4/38* (2006.01)
  *H01M 10/052* (2010.01)
(52) U.S. Cl.
  CPC .............. *H01M 2300/0025* (2013.01); *H01M 2300/0088* (2013.01)

(56) References Cited

U.S. PATENT DOCUMENTS

| | | | |
|---|---|---|---|
| 2015/0125759 A1 | 5/2015 | Xu et al. | |
| 2016/0190640 A1* | 6/2016 | Visco | H01M 10/0562 429/322 |
| 2016/0233549 A1 | 8/2016 | Tiruvannamalai et al. | |
| 2016/0240896 A1 | 8/2016 | Zhang et al. | |
| 2016/0248122 A1 | 8/2016 | Hwang et al. | |
| 2017/0346060 A1 | 11/2017 | Visco et al. | |
| 2018/0131040 A1 | 5/2018 | Visco et al. | |
| 2018/0183055 A1 | 6/2018 | Chang et al. | |
| 2018/0251681 A1 | 9/2018 | Zhang et al. | |
| 2018/0254524 A1 | 9/2018 | Zhang et al. | |
| 2019/0051926 A1 | 2/2019 | Chao et al. | |
| 2019/0058205 A1* | 2/2019 | Zhang | H01M 8/023 |
| 2019/0348705 A1* | 11/2019 | Chen | H01M 50/449 |

FOREIGN PATENT DOCUMENTS

| | | |
|---|---|---|
| CN | 102723527 A | 10/2012 |
| CN | 103190027 A | 7/2013 |
| CN | 104124470 A | 10/2014 |
| CN | 104466232 A | 3/2015 |
| CN | 205159452 U | 4/2016 |
| CN | 108711636 A | 10/2018 |
| TW | 201824628 A | 7/2018 |
| TW | I634889 B | 9/2018 |
| WO | WO 2018/052371 A1 | 3/2018 |

OTHER PUBLICATIONS

Choudhury et al., "Electroless Formation of Hybrid Lithium Anodes for Fast Interfacial Ion Transport", Angewandte Chemie, International Edition, vol. 56, Issue 42, Oct. 9, 2017, p. 3070-13077.

Duan et al., "Dendrite-Free Li-Metal Battery Enabled by a Thin Asymmetric Solid Electrolyte with Engineered Layers", J. Am. Chem Soc., 2018, 140, pp. 82-85.

Li et al., "Dendrite-Free and Performance-Enhanced Lithium Metal Batteries through Optimizing Solvent Compositions and Adding Combinational Additives", Lithium Metal Batteries, vol. 8, Issue15, May 25, 2018, 1703022, pp. 1-10.

Lu et al., "Stable lithium electrodeposition in liquid and nanoporous solid electrolytes", Nature Materials, vol. 13, Oct. 2014, pp. 961-969.

Miao et al.,"Novel dual-salts electrolyte solution for dendrite-free lithium-metal based rechargeable batteries with high cycle reversibility", Elsevier, Journal of Power Sources, vol. 271, Dec. 20, 2014, pp. 291-297.

Wood et al., "Dendrites and Pits: Untangling the Complex Behavior of Lithium Metal Anodes through Operando Video Microscopy", ACS Central Science, 2016, 2, pp. 790-801.

Chinese Office Action and Search Report for Chinese Application No. 201910649745.3, dated Jan. 6, 2021.

Taiwanese Office Action and Search Report for corresponding Taiwanese Application No. 108116351, dated Oct. 18, 2019.

* cited by examiner

BATTERY

CROSS REFERENCE TO RELATED APPLICATIONS

This application claims the benefit of U.S. Provisional Application No. 62/769,182 filed on Nov. 19, 2018, the entirety of which is incorporated by reference herein.

The application is based on, and claims priority from, Taiwan Application Serial Number 108116351, filed on May, 13, 2019, the disclosure of which is hereby incorporated by reference herein in its entirety.

TECHNICAL FIELD

The technical field relates to a battery.

BACKGROUND

In conventional liquid electrolyte lithium ion batteries, the energy storage cost per unit is high due to the low gravimetric energy density and the limited cycle life. However, unilaterally increasing the energy density of batteries will easily induce serial safety problems in electrochemical batteries, such as liquid leakage, battery swelling, heating, fuming, burning, explosion, and the like. As such, suitable applications for the batteries are seriously limited. In addition, the electrolyte being suitable for the cathode may negatively impact the anode, and the electrolyte being suitable for the anode may negatively impact the cathode. In other words, no electrolyte is simultaneously suitable for the cathode and the anode.

For addressing the above issue, a catholyte is selected to match the cathode, and an anolyte is selected to match the anode. However, the composition of the catholyte and the anolyte generally change as the materials of the cathode and the anode change. No catholyte and anolyte can match all cathode and anode materials. Furthermore, separating the catholyte and the anolyte is a challenge, too.

Accordingly, a novel catholyte and anolyte corresponding to a design that combines specific cathode and anode materials is called for, as well as a suitable film for efficiently separating the catholyte and the anolyte.

SUMMARY

One embodiment of the disclosure provides a battery, including an anode, a cathode, an electrolyte film, a porous film, an anolyte, and a catholyte. The anode includes a first current collector and an anode active material. The anode active material is lithium metal or lithium alloy. The cathode includes a second current collector and a cathode active material. The cathode active material includes a lithium oxide, lithium sulfide, lithium selenide, lithium telluride, lithium phosphide, lithium silicide, lithium aluminide, or lithium boride of aluminum, vanadium, titanium, chromium, copper, molybdenum, niobium, iron, nickel, cobalt, or manganese, or a combination thereof. The electrolyte film is disposed between the cathode and the anode. The porous film is disposed between the electrolyte film and the anode. The anolyte is in the porous film between the electrolyte film and the anode. The catholyte is between the electrolyte film and the cathode. The catholyte is different from the anolyte. The anolyte and the catholyte are separated by the electrolyte film and are not in contact with each other.

One embodiment of the disclosure provides a battery, comprising: an anode; a cathode; an electrolyte film disposed between the cathode and the anode; a porous film disposed between the electrolyte film and the anode; an anolyte in the porous film between the electrolyte film and the anode; and a catholyte between the electrolyte film and the cathode, wherein the catholyte is different from the anolyte, and the anolyte and the catholyte are separated by the electrolyte film and are not in contact with each other; wherein the electrolyte film includes: (a) 100 parts by weight of oxide-based solid state inorganic electrolyte; (b) 20 to 70 parts by weight of $Li[R^2(-OR^1)_n-OR^2]Y$, wherein $R^1$ is $C_{1-4}$ alkylene group, $R^2$ is $C_{1-4}$ alkyl group, n is 2 to 100, and Y is $PF_6^-$, $BF_4^-$, $AsF_6^-$, $SbF_6^-$, $ClO_4^-$, $AlCl_4^-$, $GaCl_4^-$, $NO_3^-$, $C(SO_2CF_3)_3^-$, $N(SO_2CF_3)_2^-$, $SCN^-$, $O_3SF_2CF_3^-$, $C_6F_5SO_3^-$, $O_2CCF_3^-$, $SO_3F^-$, $B(C_6H_5)_4^-$, $CF_3SO_3^-$, or a combination thereof; (c) 1 to 10 parts by weight of nano oxide; and (d) 1 to 20 parts by weight of binder.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a battery, which includes an anode, a cathode, and an electrolyte film disposed between the cathode and the anode. In one embodiment, the anode includes a first current collector and an anode active material, and the anode active material is lithium metal or lithium alloy. The first current collector includes metal foil such as copper foil or stainless foil. In one embodiment, the cathode includes a second current collector and a cathode active material. The cathode active material may include a lithium oxide, lithium sulfide, lithium selenide, lithium telluride, lithium phosphide, lithium silicide, lithium aluminide, or lithium boride of aluminum, vanadium, titanium, chromium, copper, molybdenum, niobium, iron, nickel, cobalt, or manganese, or a combination thereof. The second current collector includes metal foil such as aluminum foil or copper foil. The battery also includes a porous film disposed between the electrolyte film and the anode. In one embodiment, the porous film has a porosity of 20% to 80%, such as 20% to 50%. The electrolyte is difficult to be impregnated into a porous film with an overly low porosity. A porous film with an overly high porosity easily generates lithium dendrites to cause internal short. The porous film, for example, can be polyethylene, polypropylene, ceramic material, or a combination thereof. The battery also includes anolyte and catholyte, which are different in compositions and/or composition ratios. The anolyte and the catholyte are separated by the electrolyte film and are not in contact with each other. The anolyte is disposed between the electrolyte film and the anode, and the catholyte is disposed between the electrolyte film and the cathode. The porous film may contain the anolyte to mitigate the consumption of the anolyte. For example, the anolyte is disposed in the porous film between the electrolyte and the anode. In other words, the electrolyte can separate the catholyte and the anolyte. If the catholyte is in contact with the anolyte, they will diffuse into each other instead of staying in two separate electrolyte system, which may deteriorate the battery performance. In some embodiments, the battery may further include another porous film disposed between the cathode and the electrolyte to assist the cathode to contain the catholyte.

In some embodiments, the catholyte includes a first solvated solvent (solvent for salt solvation), a first diluent solvent, and a first lithium salt. The anolyte includes a second solvated solvent, a second diluent solvent, and a second lithium salt. The first diluent solvent alone does not dissolve the first lithium salt, and the second diluent solvent alone does not dissolve the second lithium salt. The first solvated solvent and the first diluent solvent have a volume ratio of 1:1 to 1:10. An overly high amount of the first solvated solvent easily induces free anions to corrode aluminum foil. An overly low amount of the first solvated solvent may not completely dissolve the lithium salt. The second solvated solvent and the second diluent solvent have a volume ratio of 1:0.1 to 1:5. An overly high amount of the second solvated solvent may passivate lithium metal. An overly low amount of the second solvated solvent may not completely dissolve the lithium salt.

In some embodiments, the highest occupied molecular orbital (HOMO) of the first diluent solvent is higher than the HOMO of the second diluent solvent. If the HOMO of the first diluent solvent is lower than or equal to the HOMO of the second diluent solvent, the first diluent solvent is easily decomposed under high voltage, therefore the electrolyte is consumed.

In some embodiments, each of the first diluent solvent and the second diluent solvent has adsorption energy of 0 to 8.14 kJ/mol. If the first diluent solvent or the second diluent solvent has an overly high adsorption energy, a chemical reaction will be easily occurred at electrode surface to passivate the electrode activity. In addition, the adsorption energy of the first solvated solvent is higher than the adsorption energy of the first diluent solvent, and the adsorption energy of the second solvated solvent is higher than the adsorption energy of the second diluent solvent. If the adsorption energy of the first and second solvated solvents is lower than or equal to the adsorption energy of the first and second diluent solvents, the diluent solvent will participate in the SEI formation reaction, such that the electrolyte composition will be unstable to lose its original function. The first diluent solvent and the second diluent solvent can be multi-fluorinated ether solvent.

For example, each of the first diluent solvent and the second diluent solvent may include 1,1,2,2-tetrafluoroethyl-2,2,3,3-tetrafluoropropyl ether (TTFE, adsorption energy=2.35 kJ/mol, HOMO=−11.80 eV), bis(2,2,2-trifluoroethyl) ether (BTFE, adsorption energy=0 kJ/mol, HOMO=−11.37 eV), 1,1,2,2-tetrafluoroethyl-2,2,2-trifluoroethyl ether (TFTFE, adsorption energy=0 kJ/mol, HOMO=−11.93 eV), ethyl 1,1,2,2-tetrafluoroethyl ether (ETFE, adsorption energy=8.14 kJ/mol, HOMO=−11.45 eV), methyl 1,1,2,2-tetrafluoroethyl ether (MTFE, adsorption energy=5.77 kJ/mol, HOMO=−11.99 eV), 1H,1H,5H-octafluoroethyl 1,1,2,2-tetrafluoroethyl ether (OFTFE, adsorption energy=0 kJ/mol, HOMO=−11.59 eV), or another solvent with adsorption energy of 0 to 8.14 kJ/mol. The above adsorption energy is calculated based on density functional theory model, which is simulated by Vienna Ab initio simulation package (VASP) software. The calculation formula of the adsorption is shown below:

$$E_{ads} = E_{Li\text{-}anode+solvent} - E_{Li\text{-}anode} - E_{solvent}$$

wherein $E_{Li\text{-}anode+solvent}$ means the total energy of molecules of the solvated solvent (or the diluent solvent) adsorbs on the anode surface. $E_{Li\text{-}anode}$ means the pure anode surface energy. $E_{solvent}$ means the molecular energy of the solvated solvent (or the diluent solvent).

In some embodiments, the HOMO of the first solvated solvent is higher than the HOMO of the first diluent solvent, and the lowest unoccupied molecular orbital (LUMO) of the second solvated solvent is lower than the LUMO of the second diluent solvent. If the HOMO of the first solvated solvent is lower than or equal to the HOMO of the first diluent solvent, the first diluent solvent will be decomposed and consumed before the first solvated solvent under high voltage of the cathode. On the contrary, if the LUMO of the second solvated solvent is higher than or equal to the LUMO of the second diluent solvent, the second diluent solvent will be decomposed and consumed before the second solvated solvent under low voltage. For example, each of the first solvated solvent and the second solvated solvent includes propylene carbonate (HOMO=−10.90 eV), ethylene carbonate (HOMO=−11.14 eV), fluoroethylene carbonate (HOMO=−11.63 eV), vinylethylene carbonate (HOMO=−10.23 eV), γ-butyrolactone (HOMO=−10.05 eV), vinylene carbonate (HOMO=−9.91 eV), tetrahydrofuran (HOMO=−9.63 eV), dioxolane (HOMO=−9.83 eV), dimethyl carbonate (HOMO=−10.94 eV), diethyl carbonate (HOMO=−10.49 eV), ethylmethyl carbonate (HOMO=−10.69 eV), dimethyl ether (HOMO=−9.29 eV), dimethylformamide (HOMO=−9.28 eV), dimethyl sulfoxide (HOMO=−8.92 eV), dimethylacetamide (HOMO=−8.96 eV), diethyl ether (HOMO=−9.08 eV), ethylene sulfite (HOMO=−10.62 eV), dimethyl sulfite (HOMO=−10.02 eV), dimethyl sulfone (HOMO=−10.60 eV), or diphenyl sulfone (HOMO=−9.03 eV). The HOMO values are calculated based on First Principles Model, and simulated by quantum mechanical calculation through Gaussian16 software.

In one embodiment, the first lithium salt of the catholyte has a concentration of less than or equal to 1.3M, and the second lithium salt of the anolyte has a concentration of greater than or equal to 1.4M. An overly high first lithium salt concentration may increase the electrolyte viscosity and ionic conductivity impedance, which is detrimental to energy storage mechanism of the cathode. An overly low second lithium salt concentration may increase the electrolyte viscosity and ionic conductivity impedance, which is detrimental to energy storage mechanism of the cathode. In some embodiments, the first solvated solvent and anion of the first lithium salt have a molar ratio of less than or equal to 1.8 (≤1.8), and the second solvated solvent and anion of the second lithium salt have a molar ratio of greater than or equal to 1.8 (≥1.8). If the first solvated solvent and anion of the first lithium salt have an overly high molar ratio, too many free anions will easily further corrode aluminum foil to cause capacitance decay. If the second solvated solvent and anion of the second lithium salt have an overly low molar ratio, unpaired solvent will be easily increased to further corrode the lithium metal anode. In one embodiments, the first solvated solvent and anion of the first lithium salt have a molar ratio of less than 1.8 (<1.8), and the second solvated solvent and anion of the second lithium salt have a molar ratio of greater than or equal to 1.8 (≥1.8). In one embodiment, the lithium salt can be $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, or a combination thereof.

It should be understood that the critical point of the battery is utilizing different catholyte and anolyte to correspond specific cathode active material (e.g. a lithium oxide, lithium sulfide, lithium selenide, lithium telluride, lithium phosphide, lithium silicide, lithium aluminide, lithium boride of aluminum, vanadium, titanium, chromium, copper, molybdenum, niobium, iron, nickel, cobalt, or manganese, or a combination thereof) and anode active material (e.g. lithium metal or lithium alloy).

In another embodiment of the disclosure, the battery includes an anode, a cathode, and an electrolyte film disposed between the cathode and the anode. The battery also includes a porous film disposed between the electrolyte film and the anode. The porous film is similar to that described above, and the detailed description is not repeated here. The battery also includes anolyte and catholyte, which are different in compositions and/or composition ratios. The anolyte and the catholyte are separated by the electrolyte film and are not in contact with each other. The anolyte is disposed between the electrolyte film and the anode, and the catholyte is disposed between the electrolyte film and the cathode. The porous film may contain the anolyte to mitigate the consumption of the anolyte. For example, the anolyte is disposed in the porous film between the electrolyte and the anode. In other words, the electrolyte can separate the catholyte and the anolyte. If the catholyte is in contact with the anolyte, they will diffuse into each other instead of staying in two separate electrolyte system, which may deteriorate the battery performance. The catholyte and the anolyte are similar to those described above, and the detailed description is not repeated here.

In this embodiment, the electrolyte film includes (a) 100 parts by weight of oxide-based solid state inorganic electrolyte, (b) 20 to 70 parts by weight of $Li[R^2(-OR^1)_n-OR^2]Y$, wherein $R^1$ is $C_{1-4}$ alkylene group, $R^2$ is $C_{1-4}$ alkyl group, n is 2 to 100, and Y is $PF_6^-$, $BF_4^-$, $AsF_6^-$, $SbF_6^-$, $ClO_4^-$, $AlCl_4^-$, $GaCl_4^-$, $NO_3^-$, $C(SO_2CF_3)_3^-$, $N(SO_2CF_3)_2^-$, $SCN^-$, $CF_3CF_2SO_3^-$, $C_6F_5SO_3^-$, $CF_3CO_2^-$, $SO_3F^-$, $B(C_6H_5)_4^-$, $CF_3SO_3^-$, or a combination thereof, (c) 1 to 10 parts by weight of nano oxide, and (d) 1 to 20 parts by weight of binder. In one embodiment, the oxide-based solid state inorganic electrolyte can be lithium-based oxide-based solid state inorganic electrolyte, including lithium lantha- num zirconium oxide, lithium lanthanum titanium oxide, lithium aluminum titanium phosphate, and the like, or a combination thereof.

Too little $Li[R^2(-OR^1)_n-OR^2]Y$ may result in an overly low ionic conductivity of the electrolyte film. Too much $Li[R^2(-OR^1)_n-OR^2]Y$ may result in a poor mechanical strength of the electrolyte film. An overly small n value may result in a poor mechanical strength of the electrolyte film. An overly large n value may result in an overly low ionic conductivity of the electrolyte film at room temperature. In one embodiment, $R^1$ is ethylene group, $R^2$ is methyl group, n is 4, and Y is $N(SO_2CF_3)_2^-$ for $Li[R^2(-OR^1)_n-OR^2]Y$.

Too little nano oxide causes a low film formability of the electrolyte. Too much nano oxide causes the poor ionic conductivity of the electrolyte. In one embodiment, the nano oxide includes silicon oxide, aluminum oxide, cerium oxide, titanium oxide, or a combination thereof. In one embodiment, the nano oxide has a size of 5 nm to 100 nm. Nano oxide that is too small may not be easily dispersed in the electrolyte. Nano oxide that is too large may result in the electrolyte having poor ionic conductivity.

Too little binder cannot form the electrolyte film. Too much binder may form a hard and brittle film. In one embodiment, the binder includes polyvinylidene difluoride, polytetrafluoroethylene, polyvinyl alcohol, polyethylene glycol, carboxymethyl cellulose, styrene-butadiene rubber, polyacrylate, polyacrylonitrile, or a combination thereof.

In one embodiment, $R^2(-OR^1)_n-OR^2$ is mixed with LiY to form $Li[R^2(-OR^1)_n-OR^2]Y$, and the nano oxide is then added thereto for forming a quasi solid state electrolyte. The oxide-based solid state inorganic electrolyte is then added to the quasi solid state electrolyte to be mixed, and the binder is then added thereto. As such, an organic-inorganic composite electrolyte is formed, which can be compacted into a film (composite electrolyte film).

Alternatively, the electrolyte may further includes (e) 1 to 20 parts by weight of hyper-branched polymer, and the surface of the oxide-based solid state inorganic electrolyte is modified by the hyper-branched polymer. The hyper-branched polymer may improve the organic-inorganic compatibility and enhance the ionic conductivity of the composite electrolyte film. Too much hyper-branched polymer may result in a poor ionic conductivity of the composite electrolyte film. In one embodiment, the hyper-branched polymer and the surface of the oxide-based solid state inorganic electrolyte have chemical bondings therebetween. The hyper-branched polymer is formed by a cross-linking reaction of a prepolymer and a basic promoter, and the prepolymer is formed by a reaction of a precursor containing a maleimide functional group and a precursor of a Lewis base. For example, the precursor containing a maleimide functional group may have a structure of or a combination thereof, wherein $R^3$ is —CH$_2$NHCH$_2$—, —C$_2$H$_4$NHC$_2$H$_4$—, —C(O)CH$_2$—, —CH$_2$OCH$_2$—, —C(O)—, —O—, —S—, —S—S—, —S(O)—, —CH$_2$S(O)CH$_2$—, —(O)S(O)—, —CH$_2$(C$_6$H$_4$)CH$_2$—, —CH$_2$(C$_6$H$_4$)O—, —(CH$_2$CH(CH$_3$)O)—, phenylene group, biphenylene group, C$_{2-8}$ alkylene group, each $R^6$ is independently —(CH$_2$CH$_2$)O—, phenylene group, or C$_{2-8}$ alkylene group. $R^4$ is C$_{2-8}$ alkylene group, —C(O)—, —C(CH$_3$)$_2$—, —O—, —S—, —S—S—, —S(O)—, —(O)S(O)—, or —O(C$_6$H$_4$)C(CF$_3$)$_2$(C$_6$H$_4$)O—.

When m=3, $R^5$ is wherein each $R^6$ is independently —(CH$_2$CH$_2$)O—, phenylene group, or C$_{2-8}$ alkylene group. a+b+c=5 or 6, and each of a, b, and c is greater than or equal to 1. When m=4, $R^5$ is and each $R^6$ is independently of —(CH$_2$CH$_2$)O—, phenylene group, or C$_{2-8}$ alkylene group. When m=8, $R^5$ is wherein m'=2-5.

The precursor of Lewis base may have a structure of wherein Z is —SH or —NH$_2$, and $R^7$ is wherein a'+b'=45, or

The basic promoter may have a structure of

-continued wherein each $R^8$ is independently H, alkyl group, alkenyl group, phenyl group, dimethylamino group, halogen, or —$NH_2$, and wherein each $R^9$ is independently alkyl group, alkenyl group, phenyl group, or halogen.

In this embodiment, the anode of the battery includes a first current collector and an anode active material, and the anode active material includes lithium metal, lithium alloy, meso carbon micro bead (MCMB), vapor grown carbon fiber (VGCF), carbon nanotube (CNT), graphene, coke, graphite, carbon black, acetylene black, carbon fiber, glassy carbon, lithium titanium oxide, silicon, silicon-based alloy, tin, tin-based alloy, or a combination thereof. The first current collector includes metal foil, such as copper foil or stainless steel foil. In this embodiment, the cathode of the battery includes second current collector and cathode active material. The second current collector includes metal foil such as aluminum foil or copper foil. The cathode active material includes elementary sulfur, organic sulfide, sulfur carbon composite, or a lithium oxide, lithium sulfide, lithium selenide, lithium telluride, lithium phosphide, lithium silicide, lithium aluminide, lithium boride of aluminum, vanadium, titanium, chromium, copper, molybdenum, niobium, iron, nickel, cobalt, or manganese, or a combination thereof.

It should be understood that the critical point of the embodiments is utilizing specific electrolyte film to separate the anolyte and the catholyte for several cathode and anode materials. The electrolyte film can be prepared by the method disclosed in Taiwan Patent No. 1634689. Note that Taiwan Patent No. 1634689 does not disclose the catholyte and the anolyte, and silent about the electrolyte film effect such as separating the catholyte and the anolyte. In other words, one skilled in the art cannot easily use the electrolyte film to separate the catholyte and the anolyte on the basis of Taiwan Patent No. 1634689.

Accordingly, one embodiment of the disclosure provides a novel battery with different catholyte and anolyte. In conventional skills, the single electrolyte liquid cannot simultaneously satisfy the different requirements of the electrolyte liquids for the cathode and the anode. However, the bi-electrolyte liquids system may address the above issue.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Electrolyte 1a
1.8 mL of dimethyl carbonate (DMC, solvated solvent) and 7.0 mL of bis(2,2,2-trifluoroethyl)ether (BTFE, diluent solvent) were mixed. 2.4 g of lithium bis(fluorosulfonyl) imide (LiFSI) was dissolved in the mixing solvent to form 1.2M lithium salt solution, wherein $FSI^-$ and DMC had a molar ratio of 1:1.8.

Electrolyte 1b
2.1 mL of DMC (solvated solvent) and 6.5 mL of BTFE (diluent solvent) were mixed. 2.8 g of LiFSI was dissolved in the mixing solvent to form 1.4M lithium salt solution, wherein $FSI^-$ and DMC had a molar ratio of 1:1.8.

Electrolyte 2a
2.3 mL of DMC (solvated solvent) and 6.3 mL of 1,1,2,2-tetrafluoroethyl-2,2,3,3-tetrafluoropropyl ether (TTFE, diluent solvent) were mixed. 2.8 g of LiFSI was dissolved in the mixing solvent to form 1.4M lithium salt solution, wherein $FSI^-$ and DMC had a molar ratio of 1:2.

Electrolyte 2b
2.1 mL of DMC (solvated solvent) and 6.5 mL of TTFE (diluent solvent) were mixed. 2.8 g of LiFSI was dissolved in the mixing solvent to form 1.4M lithium salt solution, wherein $FSI^-$ and DMC had a molar ratio of 1:1.8.

Electrolyte DS
4.7 mL of ethylene carbonate (EC) and 4.7 mL of diethyl carbonate (DEC) were mixed. 1.8 g of LiFSI (0.6M) and 0.8 g of lithium bis(ethanedioato)borate (LiBOB, 0.4M) were dissolved in the mixing solvent to form lithium salt solution.

Electrolyte LE
4.7 mL of EC and 4.7 mL of DEC were mixed. 1.7 g of lithium hexafluorophosphate ($LiPF_6$, 1.1M) was dissolved in the mixing solvent to form lithium salt solution.

Comparative Electrolyte 1
2.77 g of LiFSI was dissolved in 9.2 mL of DMC to form 1.4M lithium salt solution.

Comparative Electrolyte 2
1.5 mL of DMC (solvated solvent) and 8.0 mL of BTFE (diluent solvent) were mixed. 2.4 g of LiFSI was dissolved in the mixing solvent to form 1.2M lithium salt solution, wherein $FSI^-$ and DMC had a molar ratio of 1:2.2.

Comparative Electrolyte 3
2.2 mL of DMC (solvated solvent) and 7.2 mL of BTFE (diluent solvent) were mixed. 2.6 g of LiFSI was dissolved in the mixing solvent to form 1.3M lithium salt solution, wherein $FSI^-$ and DMC had a molar ratio of 1:2.0.

Comparative Electrolyte 4
2.2 mL of DMC (solvated solvent) and 7.4 mL of TTFE (diluent solvent) were mixed. 2.4 g of LiFSI was dissolved in the mixing solvent to form 1.2M lithium salt solution, wherein $FSI^-$ and DMC had a molar ratio of 1:2.2.

Example 1 (Lithium Metal Symmetrical Battery for Testing Anode Stability)

Li metal foil with a thickness of 100 micrometers was selected as cathode active material and anode active material. Copper foil (commercially available from Honjo Metal Co., Ltd) was selected as the current collector for the cathode and the anode. Porous separator film Celgard 2320 (commercially available from Ubiq Taiwan) was disposed between the cathode and the anode. The porous separator film was wetted with 30 μL of Electrolyte 1a, Electrolyte 1b, Electrolyte 2a, Electrolyte 2b, Comparative Electrolyte 1, Comparative Electrolyte 2, and Comparative Electrolyte 3, respectively. Thereafter, the anode, the wetted porous separator films, and the cathode were respectively sealed to form button cell batteries CR2032. The batteries were tested by following conditions: charge/discharge current was 0.5 mA/cm$^2$ to 1.0 mA/cm$^2$, and the total charge/discharge capacitance of a single cycle was 1 mAh/cm$^2$.

The polarized voltage of the battery utilizing Comparative Electrolyte 2 started to increase after 25 charge/discharge cycles, and the polarized voltage was beyond ±0.4 voltage after 60 charge/discharge cycles. The polarized voltage of the battery utilizing Comparative Electrolyte 3 started to increase after 25 charge/discharge cycles, and the polarized voltage was beyond ±0.4 voltage after 75 charge/discharge cycles. The polarized voltage of the battery utilizing Electrolyte 1b was still in ±0.07 voltage after 200 charge/discharge cycles. Obviously, Electrolyte 1b could efficiently keep the battery stability.

In addition, the polarized voltage of the battery utilizing Electrolyte 1b started to increase after 230 charge/discharge cycles, and the polarized voltage was beyond ±0.4 voltage after 280 charge/discharge cycles. The polarized voltage of the battery utilizing Electrolyte 2a was still in ±0.05 voltage after 280 charge/discharge cycles, and the polarized voltage of the battery utilizing Electrolyte 2b was still in ±0.07 voltage after 280 charge/discharge cycles. Compared to BTFE in Electrolyte 1b, TTFE in Electrolytes 2a and 2b had an obviously higher stability with lithium. As such, Electrolytes 2a and 2b containing TTFE were more suitable for anolyte than Electrolyte 1b containing BTFE.

Figure 1:
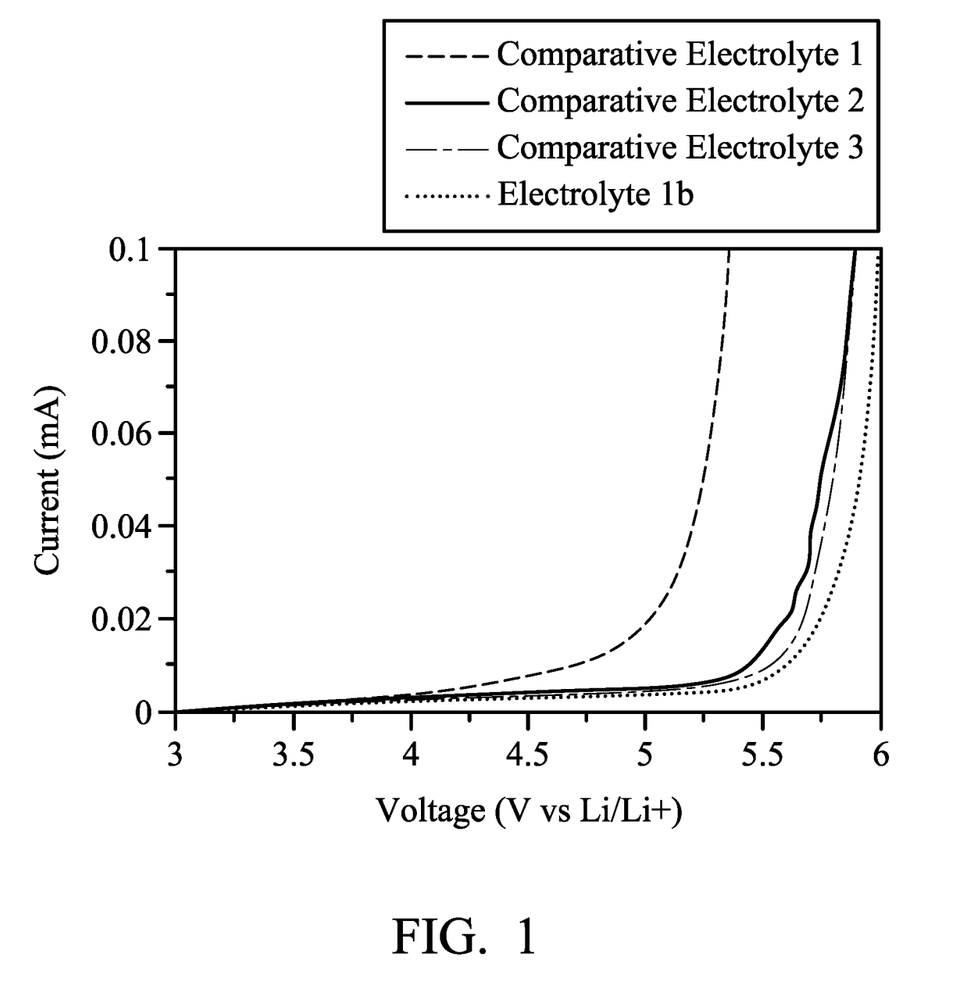
FIG. 1 shows current (mA) to voltage (V versus Li/Li$^+$) curves of batteries in one embodiment of the disclosure.
Figure 2:
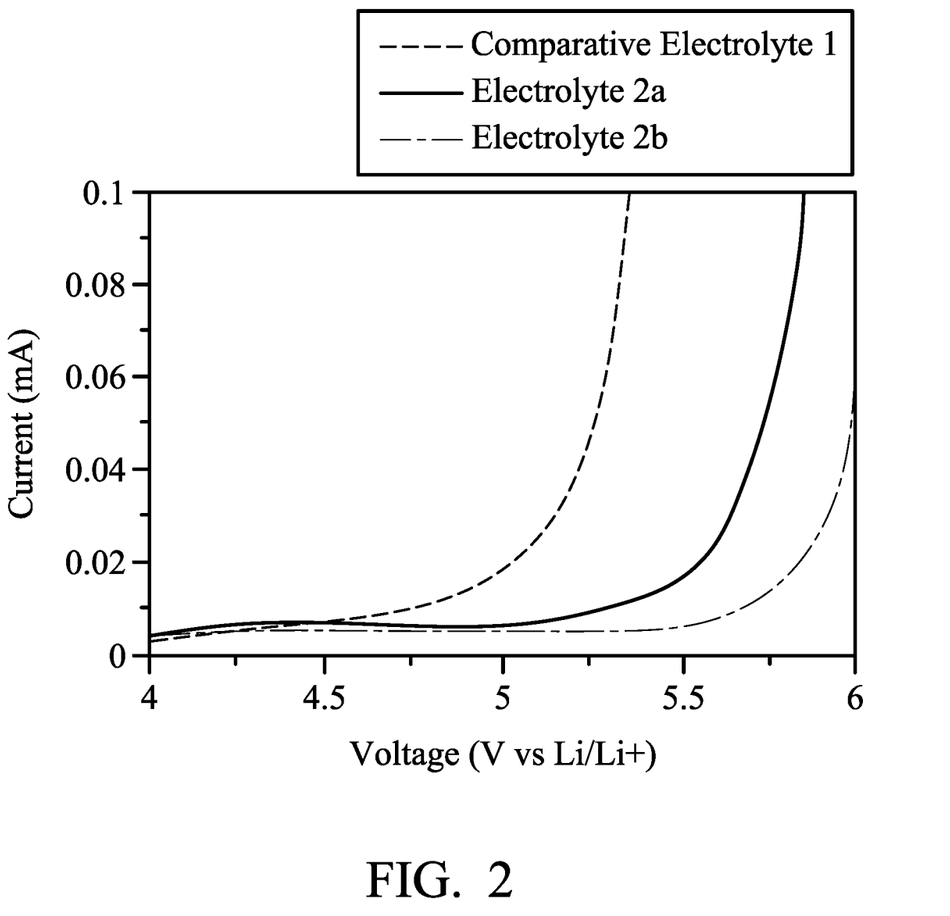
FIG. 2 shows current (mA) to voltage (V versus Li/Li$^+$) curves of batteries in one embodiment of the disclosure.

On the other hand, the current (mA) to voltage (V versus Li/Li$^+$) curves of batteries utilizing Comparative Electrolyte 1, Comparative Electrolyte 2, Comparative Electrolyte 3, and Electrolyte 1b were shown in FIG. 1. The current (mA) to voltage (V versus Li/Li$^+$) curves of batteries utilizing Comparative Electrolyte 1, Electrolyte 2a, and Electrolyte 2b were shown in FIG. 2. If the current of the curve started to increase at a higher voltage, the battery would be more stable. Obviously, Electrolyte 1b was better than Comparative Electrolytes 2 and 3, and greatly better than Comparative electrolyte 1. Electrolyte 2b was better than Electrolyte 2a, and greatly better than Comparative Electrolyte 1.

Example 2 (Half Cell for Testing Corrosion Resistance of Aluminum Foil, e.g. Cathode Stability Test)

Aluminum foil was selected as a working electrode, lithium foil with a thickness of 100 μm was selected as active material of a reference electrode, and copper foil (commercially available from Honjo Metal Co., Ltd) was selected as the current collector for the reference electrode. The porous separator film Celgard 2320 was selected to separate the working electrode and the reference electrode. The porous separator film was wetted by 30 μL of Electrolyte 1b, Electrolyte 2b, and Comparative Electrolyte 1, respectively. Thereafter, the working electrode, the wetted porous separator films, and the reference electrode were respectively sealed to form button cell batteries CR2032. The batteries were tested by following condition: scanned from an open circuit voltage to 6 volts by a scan rate of 0.2 mV/sec at room temperature.

Figure 3:
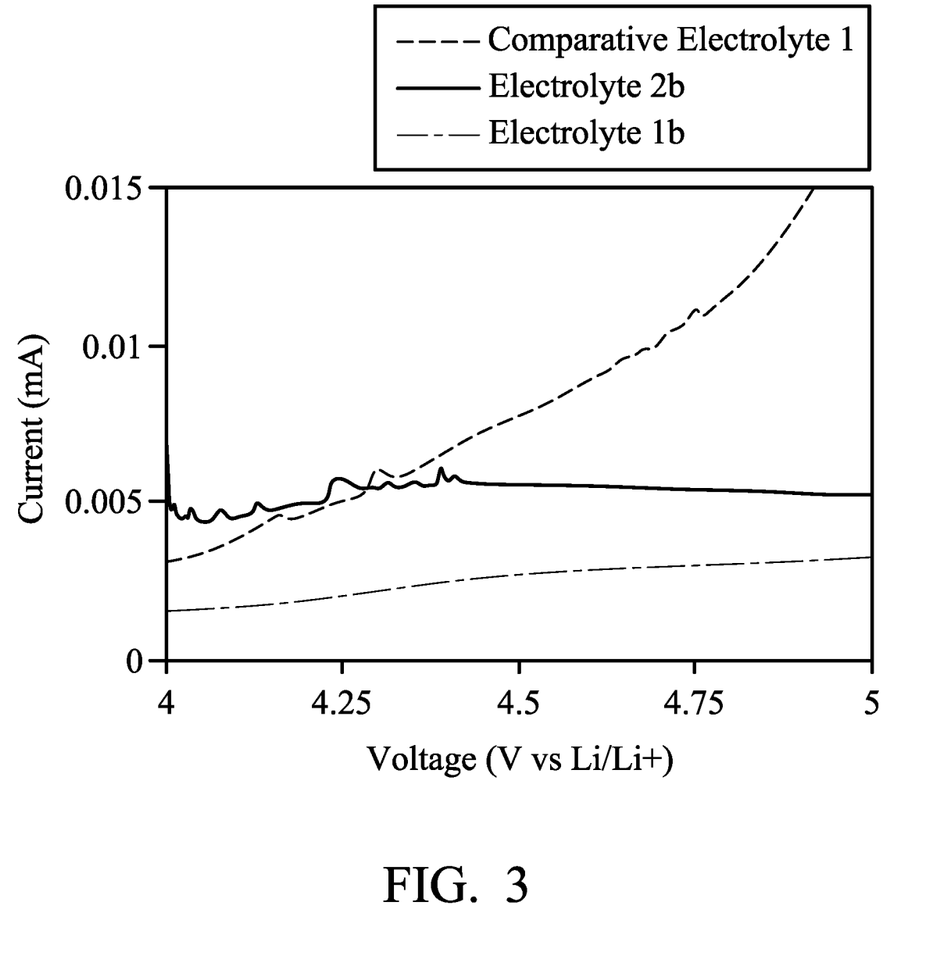
FIG. 3 shows current (mA) to voltage (V versus Li/Li$^+$) curves of batteries in one embodiment of the disclosure.

The current (mA) to voltage (V versus Li/Li$^+$) curves of batteries utilizing Comparative Electrolyte 1, Electrolyte 2b, and Electrolyte 1b were shown in FIG. 3. If the current of the curve started to increase at a higher voltage, the corrosion resistance of the aluminum foil would be higher (therefore the battery was more stable). Compared to Comparative Electrolyte 1, Electrolyte 2b and Electrolyte 1b obviously corroded less aluminum foil.

Figure 4:
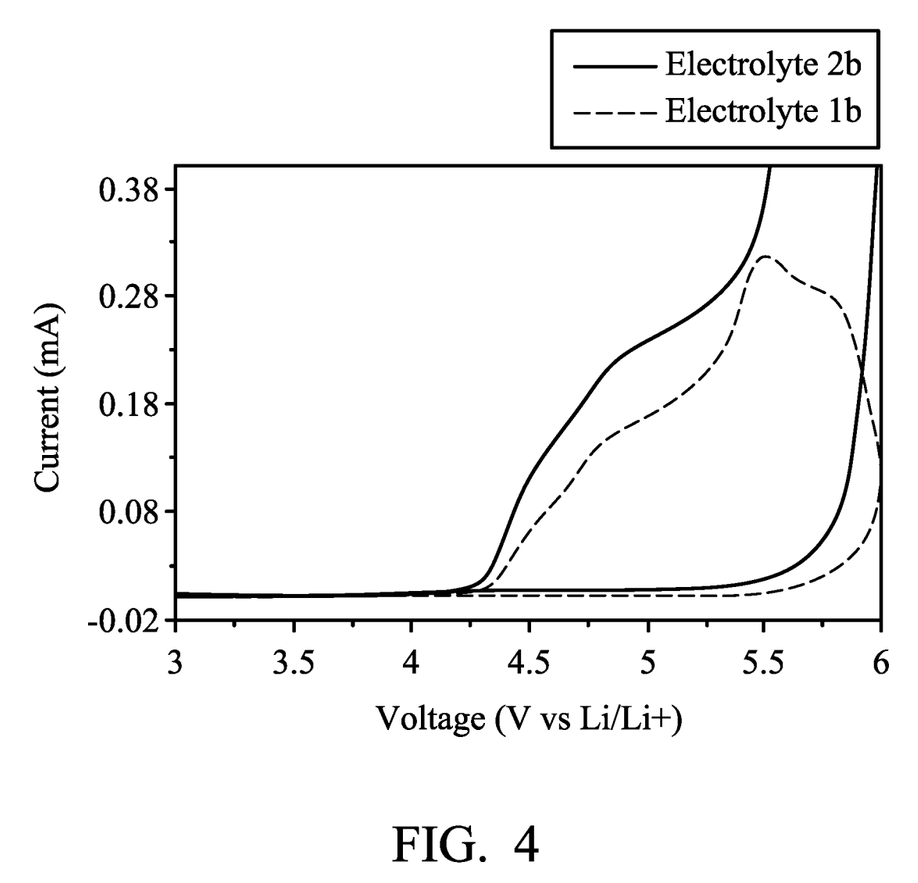
FIG. 4 shows current (mA) to voltage (V versus Li/Li$^+$) curves of batteries in one embodiment of the disclosure.

The current (mA) to voltage (V versus Li/Li$^+$) curves of batteries utilizing Electrolyte 2b and Electrolyte 1b were shown in FIG. 4. If the current of the curve started to increase at a higher voltage, the corrosion resistance of the aluminum foil would be higher (therefore the battery was more stable). Compared to Electrolyte 2b, Electrolyte 1b obviously corroded less aluminum foil. Accordingly, Electrolytes 1b containing BTFE was more suitable for catholyte than Electrolyte 2b containing TTFE.

Example 3 (Half Cell for Testing Coulombic Efficiency, e.g. Anode Coulombic Efficiency Test)

Copper foil was selected as a working electrode, lithium foil with a thickness of 100 μm was selected as active material of a reference electrode, and copper foil (commercially available from Honjo Metal Co., Ltd) was selected as the current collector for the reference electrode. The porous separator film Celgard 2320 was selected to separate the working electrode and the reference electrode. The porous separator film was wetted with 30 μL of Electrolyte 1b, Electrolyte 2b, and Comparative Electrolyte 1, respectively. Thereafter, the working electrode, the wetted porous separator films, and the reference electrode were respectively sealed to form button cell batteries CR2032. The batteries were tested by the following conditions: (1) depositing Li on the copper foil by charge (5 mAh/cm$^2$) in first cycle, and then discharge to 1 Volt; (2) depositing Li on the copper foil by charge (5 mAh/cm$^2$) in second cycle, and then discharge (1 mAh/cm$^2$); (3) then continuously charge/discharge cycle (1 mAh/cm$^2$) for 15 times; and (4) discharging Li remained on the copper foil to 1 Volt at last, wherein all the current was 0.5 mA/cm$^2$. The average coulombic efficiency was obtained as below:

$$C.E._{avg.} = \frac{nQ_{cycle,strip} + Q_{strip}}{nQ_{cycle,plate} + Q_{resevoir}}$$

After the above measure and calculation, the coulombic efficiency of the battery utilizing Comparative Electrolyte 1 was less than 20%, the coulombic efficiency of the battery utilizing Electrolyte 1b was 99.78%, and the coulombic efficiency of the battery utilizing Electrolyte 2b was 99.98%. As such, Electrolytes 2b containing TTFE was more suitable for anolyte than Electrolyte 1b containing BTFE.

Example 4 (Lithium Metal Battery with Single Electrolyte System and Without Solid-State Electrolyte Film)

Figure 5:
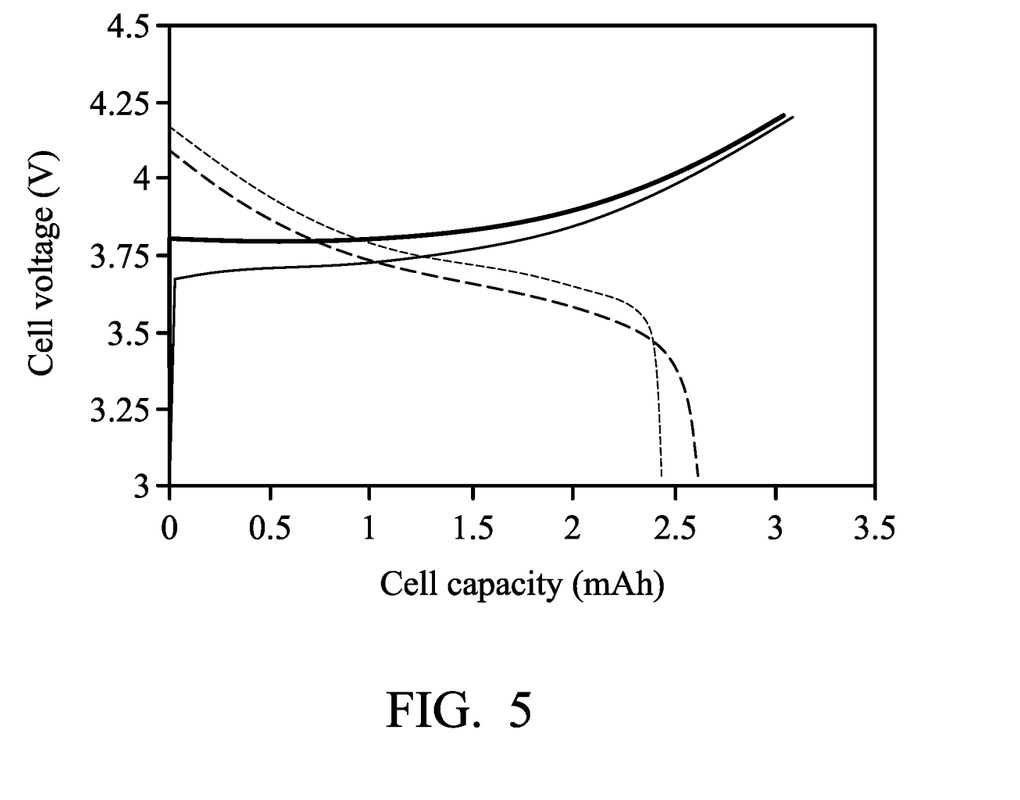
FIG. 5 shows charge/discharge curves of a battery in one embodiment of the disclosure.
Figure 6:
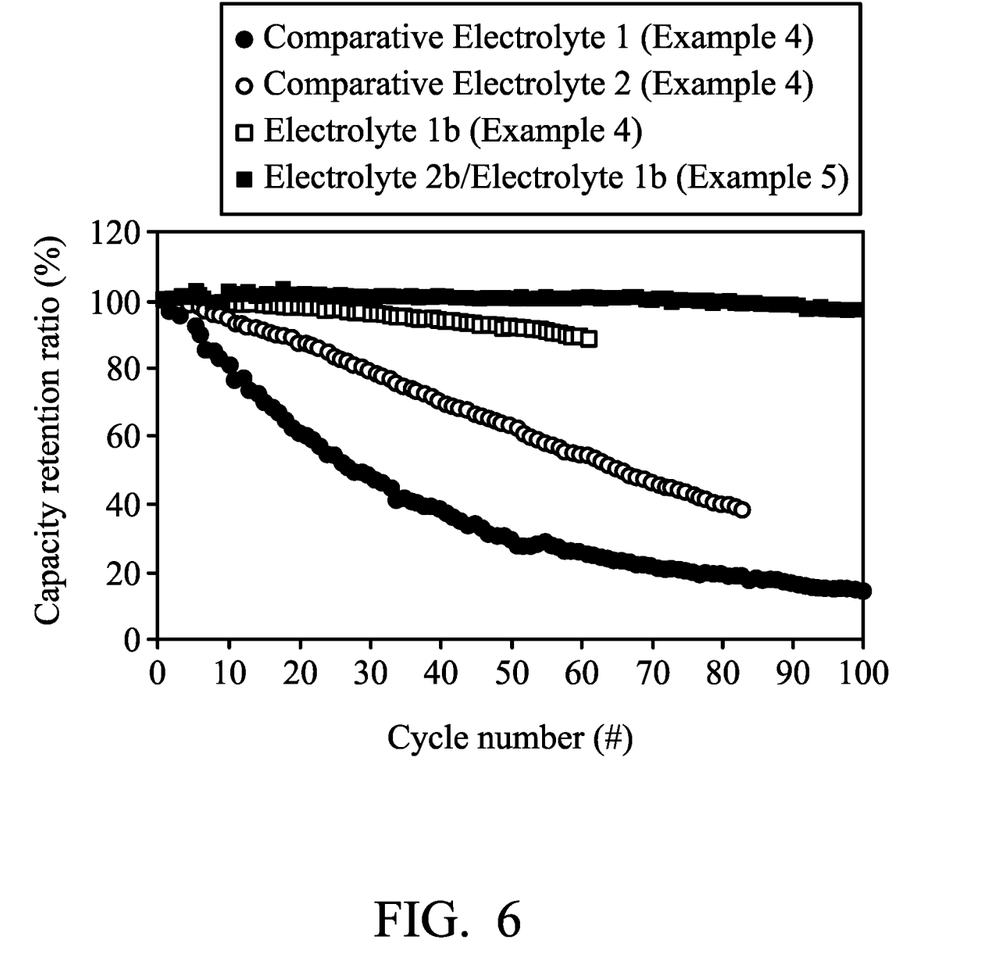
FIG. 6 shows capacity retention ratios of batteries after several charge/discharge cycles in one embodiment of the disclosure.
Figure 7:
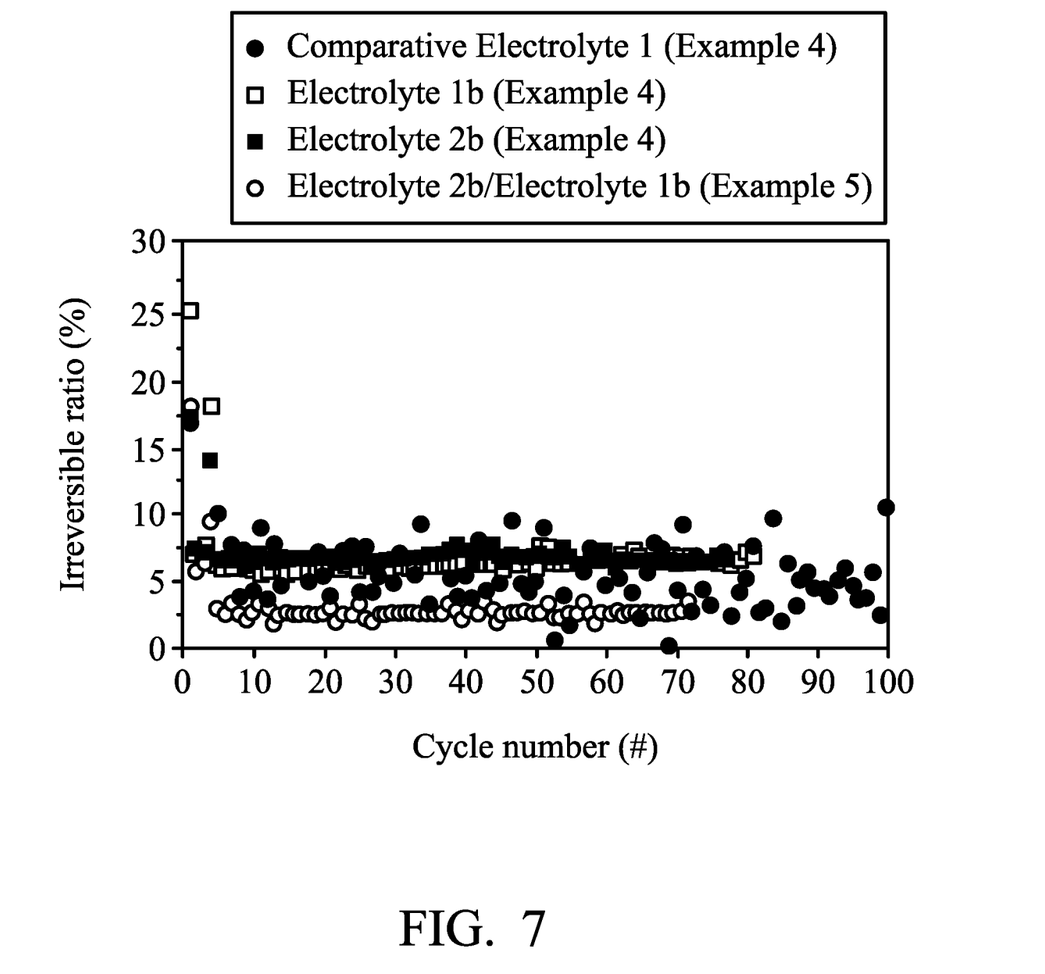
FIG. 7 shows irreversible ratios of batteries after several charge/discharge cycles in one embodiment of the disclosure.

NMC622 (commercially available from Hunan Reshine New Material Co., Ltd.) was selected as active material of cathode, and aluminum foil (commercially available from CS ALUMINIUM CORPORATION.) was selected as the current collector for the cathode. Lithium foil with a thickness of 50 micrometers was selected as active material of anode, and copper foil (commercially available from Honjo Metal Co., Ltd) was selected as the current collector for the anode. The porous separator film Celgard 2320 was selected to separate the cathode and the anode. The porous separator film was wetted with 30 μL of Electrolyte 1b, Electrolyte 2b, Comparative Electrolyte 1, Comparative Electrolyte 2, Electrolyte LE, and Electrolyte DS, respectively. Thereafter, the cathode, the wetted porous separator films, and the anode were respectively sealed to form button cell batteries CR2032. The batteries were tested by following condition: initial formation three cycles were 0.1 C charge/0.1 C discharge, following cycles were 0.2 C charge/0.5 C discharge, and 1 C=3 mA/cm$^2$. The battery utilizing Electrolyte 2b had an electrochemical impedance spectroscopy (EIS) change ratio of +140%, the battery utilizing Electrolyte LE had an EIS change ratio of +100%, and the battery utilizing Electrolyte DS had an EIS change ratio of +40%. Compared to the following Example, the batteries utilizing the single electrolyte without a solid-state electrolyte film had higher EIS change ratios. In addition, the charge/discharge curves of the battery utilizing Electrolyte 2b are shown as FIG. 5. Capacity retention ratios of batteries utilizing Comparative Electrolyte 1, Comparative Electrolyte 2, and Electrolyte 1b after several charge/discharge cycles are shown in FIG. 6. Irreversible ratios of batteries utilizing Comparative Electrolyte 1, Electrolyte 1b, and Electrolyte 2b after several charge/discharge cycles are shown in FIG. 7.

Example 5 (Lithium Metal Battery with Dual Electrolyte System and Solid-State Electrolyte Film)

NMC622 was selected as active material of cathode, and aluminum foil (commercially available from CS ALUMINIUM CORPORATION.) was selected as the current collector for the cathode. The cathode was wetted by 30 μL of catholyte (e.g. Electrolyte 1b, Electrolyte LE, or Electrolyte DS). 0.222 g of tetraethylene glycoldimethyl ether (TEGDME), 0.287 g of lithium bis(trifluoromethylsulfonyl) imide (LiTFSI), and 0.056 g of SiO$_2$ (Aerosil 812, commercially available from Degussa) were mixed to form quasi solid state electrolyte. 60 parts by weight of Li$_7$La$_3$Zr$_2$O$_{12}$ and 40 parts by weight of the quasi solid state electrolyte were mixed, and 7 parts by weight of polytetrafluoroethylene (PTFE) micropowder was then added to the mixture. The mixture was roller-compacted to form a solid-state electrolyte film with a thickness of 40 micrometers. The cathode was covered by the solid-state electrolyte film. Celgard 2320, serving as the porous film, was wetted by anolyte (such as Electrolyte 2a or Electrolyte 2b). The solid-state electrolyte film was then covered by the wetted porous film. Lithium foil with a thickness of 50 micrometers was then selected as active material of anode to cover the wetted porous film, and copper foil (commercially available from Honjo Metal Co., Ltd) was selected as the current collector for the anode. The above structures were respectively sealed to form button cell batteries CR2032. The batteries were tested by following condition: initial formation three cycles were 0.1 C charge/0.1 C discharge, following cycles were 0.2 C charge/0.5 C discharge, and 1 C=3 mA/cm$^2$. The battery with dual electrolyte system utilizing Electrolyte LE as the catholyte and Electrolyte 2b as the anolyte had an EIS change ratio of +40%. Compared to the battery with single electrolyte system utilizing only Electrolyte LE (having the EIS change ratio of +100%) and the battery with single electrolyte system utilizing only Electrolyte 2b (having the EIS change ratio of +140%), the EIS change ratio of the battery with dual electrolyte system utilizing dual electrolyte (catholyte and anolyte) could be greatly lowered to +40%. The battery with dual electrolyte system utilizing Electrolyte DS as the catholyte and Electrolyte 2b as the anolyte had an EIS change ratio of +10%. Compared to the battery with single electrolyte system utilizing only Electrolyte DS (having the EIS change ratio of +40%) and the battery with single electrolyte system utilizing only Electrolyte 2b (having the EIS change ratio of +140%), the EIS change ratio of the battery with dual electrolyte system utilizing dual electrolyte (catholyte and anolyte) could be greatly lowered to +10%.

Figure 8:
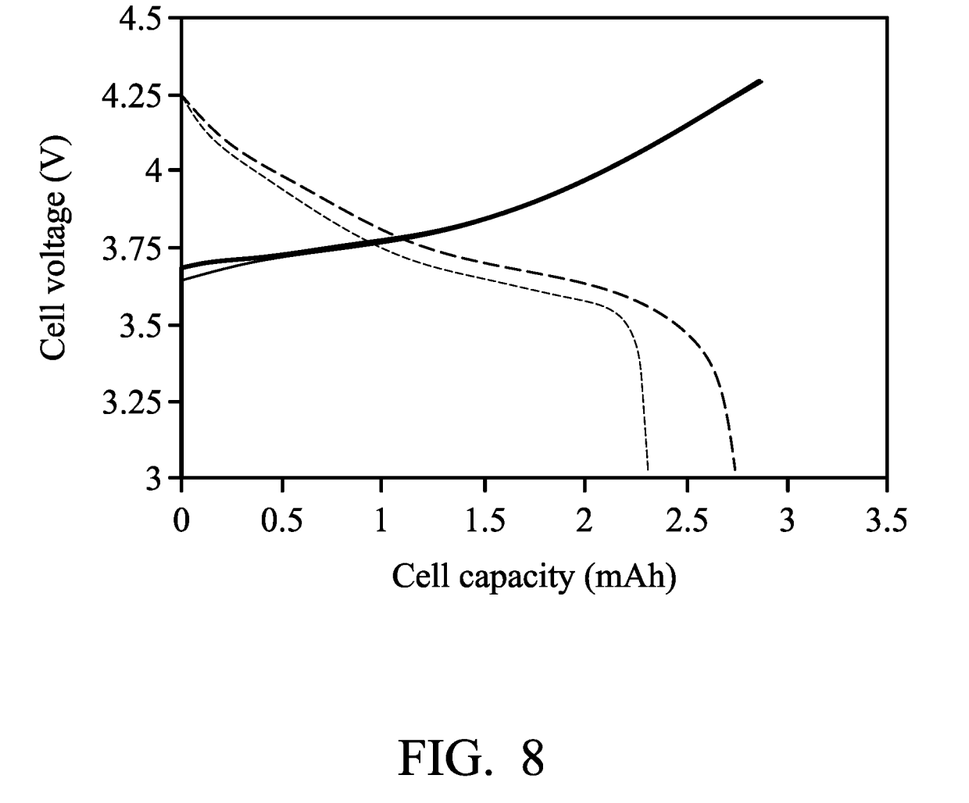
FIG. 8 shows charge/discharge curves of a battery in one embodiment of the disclosure.

The charge/discharge curves of the battery with dual electrolyte system utilizing Electrolyte DS as the catholyte and Electrolyte 2b as anolyte are shown as FIG. 8. As shown in FIGS. 5 and 8, the capacitance of the battery with dual electrolyte system after charge/discharge cycles (FIG. 8) is higher than the capacitance of the battery utilizing only Electrolyte 2b after charge/discharge cycles (FIG. 5).

Capacity retention ratio of batteries with dual electrolyte system utilizing Electrolyte 1b as the catholyte and Electrolyte 2b as the anolyte after several charge/discharge cycles is shown in FIG. 6. Irreversible ratio of batteries with dual electrolyte system utilizing Electrolyte 1b as the catholyte and Electrolyte 2b as the anolyte after several charge/discharge cycles is shown in FIG. 7. As shown in FIGS. 6 and 7, the battery with dual electrolyte system has a higher capacitance retention ratio and a lower irreversible ratio than those of the batteries utilizing single electrolyte.

Example 6 (Lithium Metal Battery with Dual Electrolyte System and Solid-State Electrolyte Film, and the Catholyte and the Anolyte were Same)

Figure 9:
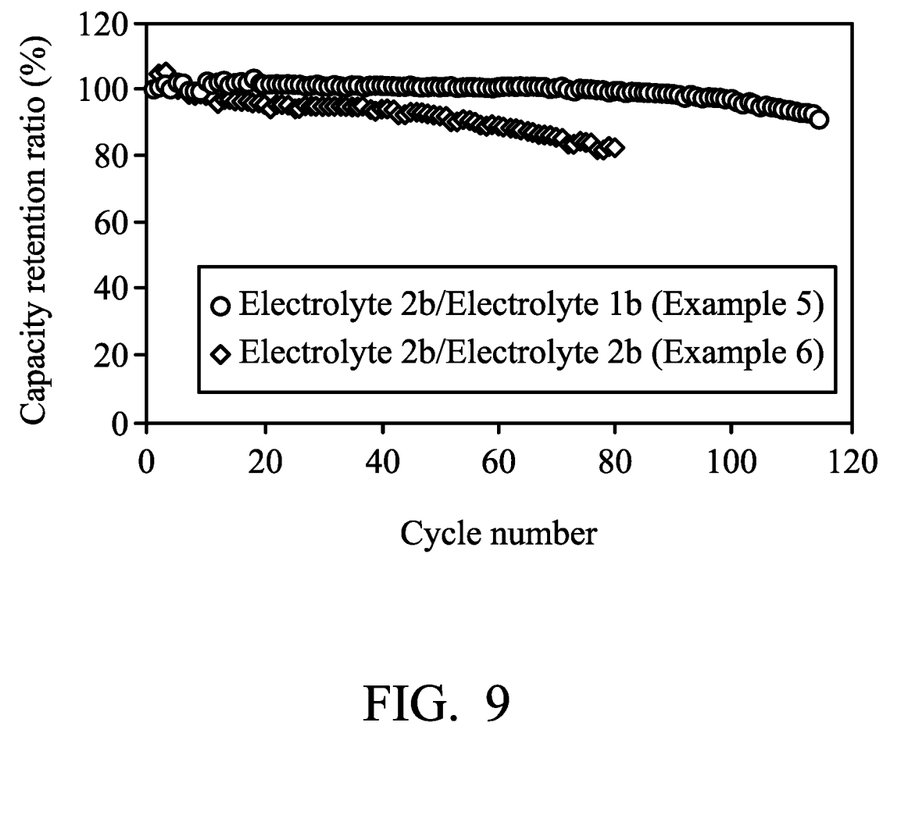
FIG. 9 shows capacity retention ratios of batteries after several charge/discharge cycles in one embodiment of the disclosure.

Example 6 was similar to Example 5, and the difference in Example 6 was the catholyte and the anolyte being same (both were Electrolyte 2b). The capacitance retention ratios of the batteries in Examples 5 and 6 are shown in FIG. 9, in which the capacitance retention ratio of the battery in Example 5 was higher than the capacitance retention ratio of the battery in Example 6. Accordingly, not only the solid-state electrolyte film but also the different catholyte and anolyte are required to improve the capacitance retention ratio of the battery.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:
1. A battery, comprising:
an anode;
a cathode;
an electrolyte film disposed between the cathode and the anode;
a porous film disposed between the electrolyte film and the anode;
an anolyte in the porous film between the electrolyte film and the anode; and
a catholyte between the electrolyte film and the cathode,
wherein the catholyte is different from the anolyte, and the anolyte and the catholyte are separated by the electrolyte film and are not in contact with each other;
wherein the electrolyte film includes:
(a) 100 parts by weight of oxide-based solid state inorganic electrolyte;
(b) 20 to 70 parts by weight of Li[R$^2$(—OR$^1$)$_n$—OR$^2$]Y, wherein R$^1$ is C$_{1-4}$ alkylene group, R$^2$ is C$_{1-4}$ alkyl group, n is 2 to 100, and Y is PF$_6^-$, BF$_4^-$, AsF$_6^-$, SbF$_6^-$,

$ClO_4^-$, $AlCl_4^-$, $GaCl_4^-$, $NO_3^-$, $C(SO_2CF_3)_3^-$, $N(SO_2CF_3)_2^-$, $SCN^-$, $CF_3CF_2SO_3^-$, $C_6F_5SO_3^-$, $CF_3CO_2^-$, $SO_3F^-$, $B(C_6H_5)_4^-$, $CF_3SO_3^-$, or a combination thereof;

(c) 1 to 10 parts by weight of nano oxide; and (d) 1 to 20 parts by weight of binder.

2. The battery as claimed in claim 1, wherein the anode comprises a first current collector and an anode active material, and the anode active material includes lithium metal, lithium alloy, meso carbon micro bead (MCMB), vapor grown carbon fiber (VGCF), carbon nanotube (CNT), graphene, coke, graphite, carbon black, acetylene black, carbon fiber, glassy carbon, lithium titanium oxide, silicon, silicon-based alloy, tin, tin-based alloy, or a combination thereof; and wherein the cathode comprises second current collector and a cathode active material, and the cathode active material includes elementary sulfur, organic sulfide, sulfur carbon composite, or a lithium oxide, lithium sulfide, lithium selenide, lithium telluride, lithium phosphide, lithium silicide, lithium aluminide, lithium boride of aluminum, vanadium, titanium, chromium, copper, molybdenum, niobium, iron, nickel, cobalt, or manganese, or a combination thereof.

3. The battery as claimed in claim 1, wherein the catholyte includes first solvated solvent, first diluent solvent, and first lithium salt, the anolyte comprises second solvated solvent, second diluent solvent, and second lithium salt, the first diluent solvent alone does not dissolve the first lithium salt, and the second diluent solvent alone does not dissolve the second lithium salt.

4. The battery as claimed in claim 3, wherein HOMO of the first diluent solvent is higher than HOMO of the second diluent solvent.

5. The battery as claimed in claim 3, wherein the first diluent solvent and the second diluent solvent have adsorption energy of 0 to 8.14 kJ/mol, the first solvated solvent has higher adsorption energy than the first diluent solvent, and the second solvated solvent has higher adsorption energy than the second diluent solvent.

6. The battery as claimed in claim 3, wherein the first diluent solvent and the second diluent solvent are multi-fluorinated ether solvent.

7. The battery as claimed in claim 3, wherein HOMO of the first solvated solvent is higher than the HOMO of the first diluent solvent, and LUMO of the second solvated solvent is lower than the LUMO of the second diluent solvent.

8. The battery as claimed in claim 3, wherein each of the first solvated solvent and the second solvated solvent independently includes propylene carbonate, ethylene carbonate, fluoroethylene carbonate, vinylethylene carbonate, γ-butyrolactone, vinylene carbonate, tetrahydrofuran, dioxolane, dimethyl carbonate, diethyl carbonate, ethylmethyl carbonate, dimethyl ether, dimethylformamide, dimethyl sulfoxide, dimethylacetamide, diethyl ether, ethylene sulfite, dimethyl sulfite, dimethyl sulfone, or diphenyl sulfone.

9. The battery as claimed in claim 3, wherein the first lithium salt of the catholyte has a concentration of less than or equal to 1.3M, and the second lithium salt of the anolyte has a concentration of greater than or equal to 1.4M.

10. The battery as claimed in claim 3, wherein the first solvated solvent and anion of the first lithium salt have a molar ratio of less than or equal to 1.8, and the second solvated solvent and anion of the second lithium salt have a molar ratio of greater than or equal to 1.8.

* * * * *